United States Patent Office 3,505,576
Patented Apr. 7, 1970

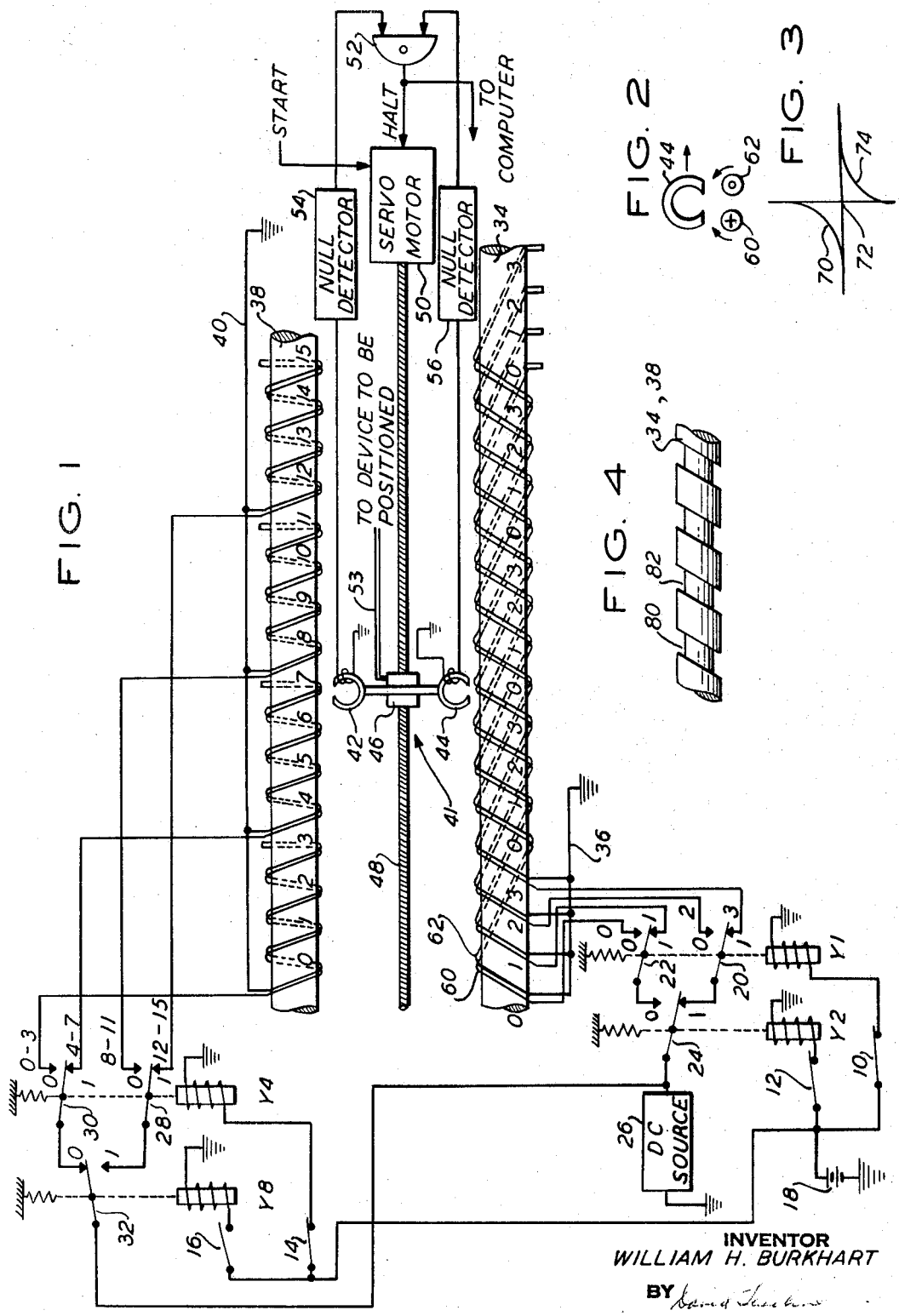

3,505,576
DIGITAL SERVOMECHANISM INCLUDING AN INDUCTIVE POSITION ENCODER
William H. Burkhart, Short Hills, N.J., assignor, by mesne assignments, to Litton Business Systems, Inc., a corporation of New York
Filed July 12, 1966, Ser. No. 564,585
Int. Cl. G05b 11/01
U.S. Cl. 318—18                                11 Claims

ABSTRACT OF THE DISCLOSURE

A digital servomechanism including a digital command source and a specific linear digital position encoder. The encoder consists to two parallel rigid bars of non-magnetic material with grooves therein to receive coil windings. One rod has a plurality of non-inductive bifilar coils wound sequentially the entire length of the rod. The other rod has a plurality of non-inductive bifilar coils wound in segments along the length of the rod. Two pickup heads are provided which are geared to the servomotor and adjacent to the respective coils. The coils are D.C. excited by the command source and the outputs of the pickup heads are summed in an "AND" gate which detects coincidence and causes the servomotor to stop.

This invention pertains to a signal translating device and more particularly to a linear positioning device for positioning a first element with respect to a second element in accordance with a digital, coded input signal.

In various aspects of today's technology, it is desirable to be able to accurately position a first element with respect to a second element. For example, in the positioning of a magnetic transducer with respect to a magnetic record or in the positioning of a cutting tool with respect to a blank from which a desired object is to be cut or milled, or for other similar tasks. Devices of the prior art which are generally available are often not compatible with devices such as data processing and computing systems. This is due to the fact that there is a code variation between the output of such data processing and computing devices and the input required in order to position the associated element. In a first of these prior art devices the positioning is done by purely mechanical means and operates according to the well-known rack-and-pinion technique. These devices, however, require a manual input and the degree of resolution of these devices for positioning is dependent upon the accuracy with which the teeth of the rack-and-pinion can be cut. Further, the backlash present in rack-and-pinion devices adds additional positioning errors which are difficult to offset. Thus it would not be possible to directly employ the output of a data processing or computing device to cause these devices to be set. Instead the output of the device might have to be printed out and in accordance with the printed results the rack-and-pinion manually set.

Other well-known devices employed in the prior art use analog techniques, comprising resistance or diode matrices or other analog voltage or current devices which are sensitive to current, voltage and temperature variations. These devices also require the manual setting of the elements or require conversion of the digital operative information to an analog signal quantity, such that the positioning device may operate. In this instance the resolution of the digital to analog converter and the component stability are the limiting factors. Its degree of resolution depending upon the technique employed and the accuracy and stability of the elements used in the analog system will determine the final degree of resolution of the over-all system in positioning an object in accordance with the digital output data of the data processing system or computer.

The present invention eliminates the cited disadvantages with respect to devices of the prior art which are mechanical or analog in nature. The present device permits the application of digital signals to cause the accurate positioning of an object directly. The invention is constructed by employing two coil means separately operated from a signal source. A first coil means composed of a plurality of multiconductor coils, is wound in such a manner that a signal may be applied to the various conductors of but one coil of the number of coils arranged along the length of a support rod. A second coil means composed of a plurality of multiconductor coils, is arranged so that corresponding conductors of each of the plurality of coils disposed along a second support rod may be separately selected and actuated from a signal source. The support rods are fabricated from materials to provide rigidity, strength, temperature insensitivity and ruggedness. The selective application of signals to selected conductors of the respective coils on the first and second support rods is by means of a decoding matrix which is originally set by means of a digital input signal. A signal detecting device is positioned for movement along a path intermediate and adjacent the two supporting rods and their coils. The signal detecting device, comprising two flux detecting heads, will sense the flux about their associated coil means and cause an output signal to be produced when each has found the one or more conductors which are activated from the signal source. It is only upon the coincident detection of signals in conductors on both of the support rods that the joint output signals of the detectors associated with the signal detecting device cause the motor device, driving the signal detecting device, to be halted. The device to be positioned is coupled to the signal detecting device such that when the motion of the signal detecting device is halted the object to be positioned is accurately positioned in accordance therewith.

It is therefore an object of this invention to provide an improved form of signal translating device.

It is another object of this invention to provide an improved form of linear positioning device.

It is yet another object of this invention to provide a linear positioning device which can be operated to position an element in accordance with a coded input information signal.

It is yet another object of this invention to provide a linear positioning device capable of positioning an element with respect to binary coded information introduced at the input of the device.

It is yet another object of this invention to provide a linear positioning device which has both a coarse and a fine positioning control whereby a high degree of resolution is possible and accurate positioning of an element is attainable.

Other objects and features of this invention will be pointed out in the following description and claims and illustrated in the accompanying drawings, which disclose, by way of example, the principle of the invention, and the best mode which has been contemplated for carrying it out.

In the figures:

FIG. 1 is a schematic diagram of a linear positioning device constructed in accordance with the basic concepts of this invention.

FIG. 2 is a schematic representation of portions of a conductor pair showing current directions within the conductors of the pair and the flux about them, together with the flux detecting head of FIG. 1.

FIG. 3 is a waveform of the flux detected by the signal detecting device of FIG. 1.

FIG. 4 is a detailed showing of the support rods for the coils of FIG. 1 with the coils removed for the sake of clarity.

Turning now to FIG. 1 there is shown a signal translating device for the linear positioning of an element in accordance with coded input information constructed in accordance with the basic concepts of this invention and showing the preferred embodiment thereof.

Inputs, coded according to the binary system of notation, and representing the digital value of the position to which the element is to be moved, is set in the linear positioning device by means of the switches 10, 12, 14 and 16, which in turn control the relays Y1, Y2, Y4 and Y8. These relays correspond in value to the binary coded values 1, 2, 4 and 8. Upon the closure of the respective switches 10, 12, 14 or 16, current is fed from the battery 18 to the windings of respective relays to cause their operation. The relays have the following movable contacts. Relay Y1 controls movable contacts 20 and 22. As shown these contacts are spring biased to the upper position which is indicated as the zero position. Thus if the relay Y1 is not operated or if it is operated with the switch 10 being placed in an open position, then the contacts 20 and 22 will move to the upper position indicated as zero. The relay Y2 has a movable contact 24 which is also spring biased to the upper position which is the zero position. The movable contact 24 is in turn coupled at one side to a source of D.C. current 26 and is adapted to be selectively connected, at its contact side, to the movable contacts 20 and 22 associated with relay Y1. Thus in response to the state of operation of the relays Y1 and Y2 in accordance with the operation of the switches 10 or 12, a path will be established from the D.C. signal source 26 through the switch contacts 24 and 20 or 22 to selected turns upon the support rod 34 to be described below.

The relay Y4 controls the movable contacts 28 and 30. These contacts are also spring loaded to contact the upper or zero position in the event that the relay Y4 is receiving a zero valued binary signal as indicated by the open position of the switch 14. The relay Y8 controls a movable contact 32 which is also spring biased to the zero or upper position. The position of the movable contact 32 is dependent upon the operation of the relay Y8 by means of the switch 16. The opposite end of the movable contact 32 is coupled to the output of the D.C. current source 26. The positions of the movable contacts 28, 30 and 32 set in response to the operation of the relays Y4 and Y8 under control of their switches 14 and 16 cause the application of D.C. current to the turns of the coils upon a second support rod 38 to be described below.

Although the device has been described in terms of switches and relays it should be readily understood that the relay contact matrices may be replaced by proper resistive or diode matrices driven in turn by flip-flops which replace the relay coils themselves and the output of the computer or data processing machines serving to establish the state of the respective flip-flops. Thus the device can be made to operate directly from the output of a computer or other data processing device.

A first support rod 34 fabricated from steel or other nonmagnetic conductive materials having great strength, rigidity, and good temperature characteristics, is provided with a plurality of conductor pairs thereon. The conductor pairs are grouped into four coils, each having four conductor pairs therein. The conductor pairs are so interconnected that corresponding conductor pairs of each of the respective coils are coupled in series. Thus the zero conductor pair of the first coil is coupled to the zero conductor pairs of the second, third and fourth coils and finally coupled to ground by means of the conductor 36. In a similar fashion all of the conductor pairs designated as 1 of the four respective coils are coupled in series and to ground by means of the conductor 36. This is also true of the conductor pairs designated 2 and 3. The zero conductor pairs are associated with the movable contact connected to the upper or zero contact associated with movable contact 22. The conductor pairs 1 are coupled to the lower or 1 contact associated with the movable contact 22. The conductor pairs 2 and 3 are respectively coupled to the upper or zero, and lower or 1, contacts 2 and 3 associated with movable contact 20.

The zero, 1, 2, and 3 conductor pairs each comprise two turn noninductive windings in order to prevent the creation of long flux paths along the support rod 34 which would prevent the possibility of detecting the flux changes associated with each conductor pair. Thus, for example, the zero conductor pair consists of a first conductor 60 wound in a first direction along the support rod 34, and a second conductor 62 wound in the opposite direction along the support rod 34. The conductor 60 is coupled to the zero contact associated with movable contact 22 at one end and is connected to conductor 62 at its other end. Conductor 62 is coupled at its second end to the ground conductor 36. As may be appreciated from FIG. 2, the clockwise flux about conductor 60 caused by current passing through it into the plane of FIG. 2, as indicated by the conventional arrow-tail notation, is cancelled by the counterclockwise flux about conductor 62 caused by the current passing through it out from the plane of FIG. 2, as indicated by the conventional arrow-point notation. In this manner each of the conductor pairs, such as conductors 60 and 62 form noninductive windings.

As is shown in FIG. 1, switches 10 and 12 have been closed, implying that a binary 1 signal has been applied for both the binary positions 1 and 2. As a result, current will flow from the battery 18 to cause the operation of relays Y1 and Y2 to move their respective movable contacts 20, 22 and 24 to the down or 1 positions. A current path will now be established for the D.C. current source 26 via the movable contact 24 to the 1 or lower contact and then through the movable contact 20 to the lower contact or 3 contact and applying it to the number 3 conductor pairs of the coils on the support rod 34. In this manner each conductor pair labeled 3 will have a D.C. signal applied to it. The fact that signals applied to the third conductor pair is indicative that this value represents the binary value of 3 expressed by the values of 1 and 2 as set by the relays Y1 and Y2 respectively.

A second support rod 38 fabricated as support rod 34 is also provided with a series of coils each having a plurality of conductor pairs. In this instance there are four conductor pairs for each one of the coils. Conductor pairs zero, 1, 2 and 3 compose the first coil, whereas the conductor pairs 4, 5, 6 and 7 compose the second coil, the conductor pairs 8, 9, 10 and 11 the third coil and the conductor pairs 12, 13, 14 and 15, the fourth coil. The conductor pairs of the coils upon support rod 38 are arranged such that when a D.C. signal is applied all the conductor pairs of a single coil will receive such a D.C. signal.

The first coil, composed of conductor pairs zero, 1, 2 and 3 is coupled to the upper or zero contact associated with movable contact 30. This contact is designated the 0–3 line to indicate the coil coupled thereto. The second coil, composed of conductor pairs 4, 5, 6 and 7 is coupled to the lower or 1 contact associated with movable contact 30 and this contact is designated 4–7. The third coil, composed of conductor pairs 8, 9, 10 and 11 is coupled to the upper or zero contact associated with movable contact 28 while the fourth coil, composed of conductor pairs 12, 13, 14 and 15 is coupled to the lower or 1 contact thereof. These contacts are further designated as 8–11 and 12–15 respectively. Each of these conductor pairs is wound and connected in the manner described with respect to conductors 60 and 62 described above.

With the device as shown, that is, with switch 14 closed and switch 16 open, a current path is established from the battery 18 to operate the relay Y4 via the closed switch 14 and thus cause the movable contacts 28 and 30 to be moved to the lower or 1 positions. As a result of this movement, a signal path will be established from the D.C. signal source 26 via the unoperated movable contact 32 to the upper or zero position and thence through the operated movable contact 30 to the lower or 1 position coupling the coil containing the conductor pairs 4, 5, 6 and 7 to the D.C. source. The opposite ends of each of the coils are coupled by means of a conductor 40 to ground.

The noninductive windings on the support rods 34 and 38 could also be replaced by providing rods of steel which are rhodium plated and whose plating is cut to create a conductive helix. Further, the support rods 34 and 38 need not be circular in cross-section but may be rectangular, square, hexagonal or any other convenient shape.

The flux detecting device 41 is positioned between and adjacent to both of the support rods 34 and 38 and the coils contained thereon. The flux detecting device 41 is formed with a first flux detecting head 42 arranged to track in close proximity to the conductors of the various coils on the support member 38 and a second flux detecting head 44 arranged to track closely with the conductors on the support rod 34 and detect the presence of flux about such conductors. The flux detecting heads 42 and 44 may be Hall effect, variable reluctance or similar flux detecting devices. Flux detecting heads 42 and 44 are coupled to a collar 46 which is arranged to be moved along a lead screw 48 which is driven by means of a servomotor 50. The servomotor 50 is caused to operate in response to a start signal provided by the computer or data processing unit or a manual switch (not shown). The servomotor will cause the lead screw to be turned and advance the collar 46 carrying with it the flux detector heads 42 and 44. Upon the detection of flux about the conductors of the coils on the support members 34 and 38, the respective flux detector heads 42 and 44 will provide input signals via null detectors 54 and 56, respectively, to an And circuit 52 which produces a halt signal to cause the stopping of the servomotor 50 as well as to provide the computer or a display device (not shown) a signal indicating that the positioning operation is complete.

Turning to FIGS. 2 and 3 the production of the input signals to the And circuit 52 by the null detectors 54 and 56 can better be understood. As the flux detector head 44 moves to the right as shown by the arrow in FIG. 2, it first detects the clockwise flux about conductor 60 producing a positive going signal portion 70 as shown in FIG. 3. When the flux detector head 44 arrives at the position shown in FIG. 2, centered above the center point between conductors 60 and 62, the clockwise flux about conductor 60 will be canceled by the counterclockwise flux about conductor 62, causing the zero crossing 72 of FIG. 3. As the flux detector head 44 continues to move to the right, it will be effected by the counterclockwise flux about conductor 62 to a degree dependent upon their relative positions. The signal portion 74 of FIG. 3 reflects the detected flux during this portion of movement of the flux detecting head 44. It is at the zero crossing point 72 or null point that the null detectors 54 and 56 produce their outputs to the And circuit 52. A coupling means 53 is provided to couple the collar 46 of the signal detection device 41 to a further element to be positioned (not shown). In this manner the element to be positioned may be positioned at the same time as the pickup heads 42 and 44 detect the presence of signals at the desired position. With the proper adjustment of the element with respect to the movement of the signal detecting device 41 it is possible to accurately position the external element (not shown) in accordance with the input digital signals.

If further resolution is required additional vernier controls can be added to the coupling between the collar 46 and the lead screw 48. Additionally, by the proper choice of the flux detecting heads 42 and 44 an A.C. current source can be employed. A sensing or clocking pulse will be required in order to determine the sampling time. This can be accomplished by differentiating the A.C. signal source output to provide properly timed sense pulses. Additionally, by providing for positive and negative peak detection of the flux detecting head outputs, it can be determined from which direction, that is left or right, the null point is being approached. The flux-detecting device 41 need not be motor driven but may be hand-driven. With the A.C. source employed relative motion is not a factor and the flux detecting heads will operate to detect the flux, however, to determine the desired position relative movement is essential. With a D.C. source the flux cannot be sensed without relative motion between the flux detecting heads and the coils.

In an alternative arrangement the flux detecting device 41 may be held stationary and the supporting rods 34 and 38, together with their respective coils, moved relative to the stationary flux detecting device 41. In this arrangement the element to be positioned would be coupled to either or both of the supporting rods 34 and 38.

Now that the elements of the device have been set forth, a typical operation will be described. It will be assumed that the switches 10, 12 and 14 are closed in response to the establishment of a binary input signal having a value of 7. As a result of the closure of switch 10, the relay Y1 will be operated and cause the movable contacts 20 and 22 to be moved to their lower positions as shown in FIG. 1 contacting the lines 1 and 3. The closure of the switch 12 will cause the relay Y2 to operate and cause the movable contact 24 to contact the lower or 1 contact as shown. As a result of the closure of these two switches, a signal will be transmitted from the D.C. signal source 26 to the conductor pair indicated as 3, providing a D.C. signal in each of the four conductor pairs designated 3. As a result of the closure of the switch 14, relay Y4 will be operated and will cause the movable contacts 28 and 30 to assume their lower positions, or positions 4–7 and 12–15, respectively. Failure to close the switch 16 will prevent the relay Y8 from operating and will allow movable contact 32 to remain in the upper position biased by its associated spring. As a result of the operation of the operation relay Y4 and the lack of operation of the relay Y8, a signal will be transmitted from the D.C. signal source 26 through the movable contact 32 through the upper or zero contact and then through the movable contact 30 in its lower or 1 position, thus causing the conductor pairs designated 4 through 7, to have a D.C. current applied to them. The start signal will then be provided by the computer or data processing device, or from a manual start switch, causing the servomotor 50 to cause the lead screw 48 to turn and cause the advancement of the collar 46 from left to right of FIG. 1. As the collar 46 moves the flux detecting device 41 moves toward the right, the first point at which flux will be detected will be at conductor pair number 4 on the support rod 38. At this time flux detecting head 42 will transmit a voltage proportional to that shown in FIG. 3, to null detector 54, which in turn will transmit a signal at the null point 70 to the first input of the And gate 52. This signal, however, will be disregarded since the And gate 52 requires two inputs for operation. The flux detecting head 42 will detect further flux patterns as shown in FIG. 3 at conductor pairs 5 and 6 of the support rod 38 causing null detector 54 to produce further signals which will be similarly disregarded. However, when the flux detecting head 42 is in the position shown with respect to conductor pair number 7 of the support rod 38, and flux detecting head 44 is in the position shown with respect to conductor pair number 3 of the support rod 34, both of the flux detecting heads 42 and 44 will sense flux patterns as shown in FIG. 3 and cause their associated null detectors 54 and 56, respectively, to provide inputs to the And gate 52 causing the production of an output signal designated halt. This output halt signal will cause the servomotor 50 to stop operation and will signal the computer or other indicating device that the element to be positioned has been positioned and the cycle of operation is complete.

The flux detecting device 41 may then be reset to the extreme left position of FIG. 1 for a further cycle of operation. This, however, is not necessary since the device could be made to reverse upon reaching the end turns of the coils on the rods 34 and 38 and made to retrace its path to find the one position where there is concurrent presence of D.C. signals in the conductor pairs of both sets of coils on the rods 34 and 38.

Additionally, a comparator could be used to compare the present flux detecting device 41 position with the next desired position and the servomotor 50 caused to drive the lead screw 48 in the direction which would bring the flux detecting device 41 to the nevt desired position most directly.

Turning now to FIG. 4 there is shown a construction of the support rods 34 or 38 which permit the conductor pairs of the coils upon these rods to be positioned such as not to be abraded by the movement of the flux detecting heads 42 and 44 during operation of the device. Rods 34 and 38 are appropriately notched at positions such as 70 and 72. These notches extend around the entire circumference of the rods 34 and 38. In this way the conductor pairs may be placed below the adjoining level of the rods and once assembled the entire unit may be epoxied and ground down to give a completely smooth unit wherein the conductor pairs of the various coils are protected from abrasion by the movement of the flux detecting device 41 with respect thereto.

It should be understood that while a relatively simple device has been shown for the purpose of illustrating the manner in which the device may be constructed and operated this is done for the purpose of illustration only and is not intended to limit the application of the device in any way. As many conductor pairs may be placed in the respective coils and as many coils may be used as are required to yield the desired degree of resolution. The conductor pair groupings in the coils on the rod 38 may be considered to supply a coarse adjustment or positioning for the element to be positioned, that is, of the 16 turns as shown on the rod 38 it is possible by means of selection relays Y4 and Y8 to pick four of the sixteen conductor pairs. The conductor pair grouping upon the rod 34 may be considered as the fine adjustment for the device since by means of these conductor pairs it is possible to pick four diverse conductor pairs, only one of which can possibly be aligned with the active conductive pairs of the coils upon the rod 38. Additional rods and coils may be employed if it is desired to get even greater resolution. This way greater resolution is possible than that which might be achieved with a single winding unit, that is containing a single rod with a high number of turns. Such a single winding unit will require very fine wire for the turns in order to get a sufficient number of turns to provide high resolution. The fine wire and close spacing of these turns will cause many problems due to the mutual coupling between the closely spaced turns. Further, it would cause problems of insulating these turns since it would not be desirable to use insulated wire since the extent of the insulation would determine the spacing between respective turns and might cause it to be too great for the desired resolution.

With the technique described, it is possible to build a device within all practical limits of coil construction. Insulated wire may be used or noninsulated wire may be employed without the problem of possible shorting of the turns with respect to one another or unnecessary mutual coupling and without losing the degree of resolution that is desirable in the modern devices.

While a single preferred embodiment has been shown, it is evident that those skilled in the art may make changes to the form for operation of the device without departing from the spirit of the invention.

What is claimed is:

1. A signal translating device for translating coded input information signals into linear position information comprising: first coil means having at least one coil, said coil having a plurality of conductor pairs therein; signal means; first selection means for selectively coupling said signal means to said plurality of conductor pairs of said coil of said first coil means; second coil means having at least one coil, said coil having a plurality of conductor pairs therein; second selection means for selectively coupling said signal means to one of said plurality of conductor pairs of said coil of said second coil means; input means coupled to said first and second selection means for receiving coded input information and operating said first and second selection means in accordance therewith; flux detecting means positioned adjacent said first and second coil means for detecting the simultaneous presence of flux about conductor pairs of both of said first and second coil means; drive means to provide relative movement along a path adjacent said first and second coil means between said first and second coil means and said flux detecting means; and indicator means to indicate the simultaneous presence of flux about conductor pairs of both of said first and second coil means whereby it is indicated that said flux detecting means is positioned in accordance with said coded input information.

2. A signal translating device for translating information bearing signals into linear positioning information comprising:
   a first coil,
   a second coil,
   means for selectively providing predetermined portions of the information bearing signals to said first coil and other predetermined portions of the information bearing signals to said second coil thereby causing flux to flow about said first and second coils,
   means for detecting flux in said coils,
   means for moving said flux detecting means with respect to said first and second coils, and
   means for positioning said detecting means in response to the presence or absence of flux in said first and second coils.

3. A signal translating device as defined in claim 2, wherein said first coil means comprises $2^{m+n}$ conductor pairs arranged in $2^m$ coils, each of said coils having $2^n$ conductor pairs and wherein all of said $2^n$ conductor pairs of each of said $2^m$ coils are arranged to be coupled to said signal means by said first selection means; said second coil means comprises $2^{m+n}$ conductor pairs arranged in $2^m$ coils, each of said coils having $2^n$ conductor pairs and wherein corresponding conductor pairs of each of said $2^m$ coils are arranged to be coupled to said signal means by said second selecting means; wherein $m$ and $n$ are both integers.

4. A signal translating device as defined in claim 3, wherein said first selection means comprises: $m$ number of selection elements, each having two stable conditions and providing $2^m$ outputs; and wherein said second selection means comprises $n$ number of selection elements, each having two stable conditions and providing $2^n$ outputs; where $m$ and $n$ are both integers.

5. A signal translating device as defined in claim 4, wherein each of said $2^m$ outputs of said first selection means is coupled to one of said $2^m$ coils of said first coil means and each of said $2^n$ outputs of said second selection means is coupled to a corresponding one of said $2^n$ conductor pairs of each of said $2^m$ coils of said second coil means.

6. A signal translating device as defined in claim 5, wherein said signal means is a source of D.C. current and said flux detecting means comprises: two flux detecting heads for detecting the presence of flux about the conductor pairs of said first and second coil means.

7. A signal translating device as defined in claim 6, wherein said first coil means is wound along a first support rod and said second coil means is wound along a second support rod; said first and second support rods positioned in parallel and spaced apart by a distance sufficient to permit said signal detecting means to be moved along a path parallel with and adjacent said first and second support rods.

8. A signal translating device as defined in claim 7, wherein said input means comprises: $m+n$ number of switch elements, where $m$ and $n$ are integers; each of said switch elements having two positions, a first of said two positions corresponding to the binary coded value of 0, and the second of said two positions corresponding to the binary coded value of 1, whereby binary coded input information may be applied to said signal translating device.

9. A signal translating device as defined in claim 8, wherein said drive means comprises: a servomotor and a lead screw coupled to said flux detection means for driving said flux detecting means relative to said first and second coil means whereby said flux detecting means can be positioned parallel with and between said first and second support rods and moved along said path parallel with and between said first and second support rods.

10. A signal translating device as defined in claim 9, further including coupling means coupled to said flux detecting means for movement therewith; said coupling means adapted to be coupled to an element to be positioned whereby said element to be positioned is positioned in accordance with the binary coded input information applied to said input means.

11. A signal translating device as defined in claim 10, further including a control means coupled to said drive means and said flux detecting means and responsive to the simultaneous presence of flux about conductor pairs of both of said first and second coil means to halt the operation of said drive means whereby said flux detecting means is positioned in accordance with said coded input information.

References Cited
UNITED STATES PATENTS

| | | |
|---|---|---|
| 3,176,282 | 3/1965 | Rhoades. |
| 3,199,006 | 8/1965 | Moreines et al. |
| 3,244,956 | 4/1966 | Mierendorf. |

THOMAS E. LYNCH, Primary Examiner

U.S. Cl. X.R.

318—28, 30; 340—347